UNITED STATES PATENT OFFICE.

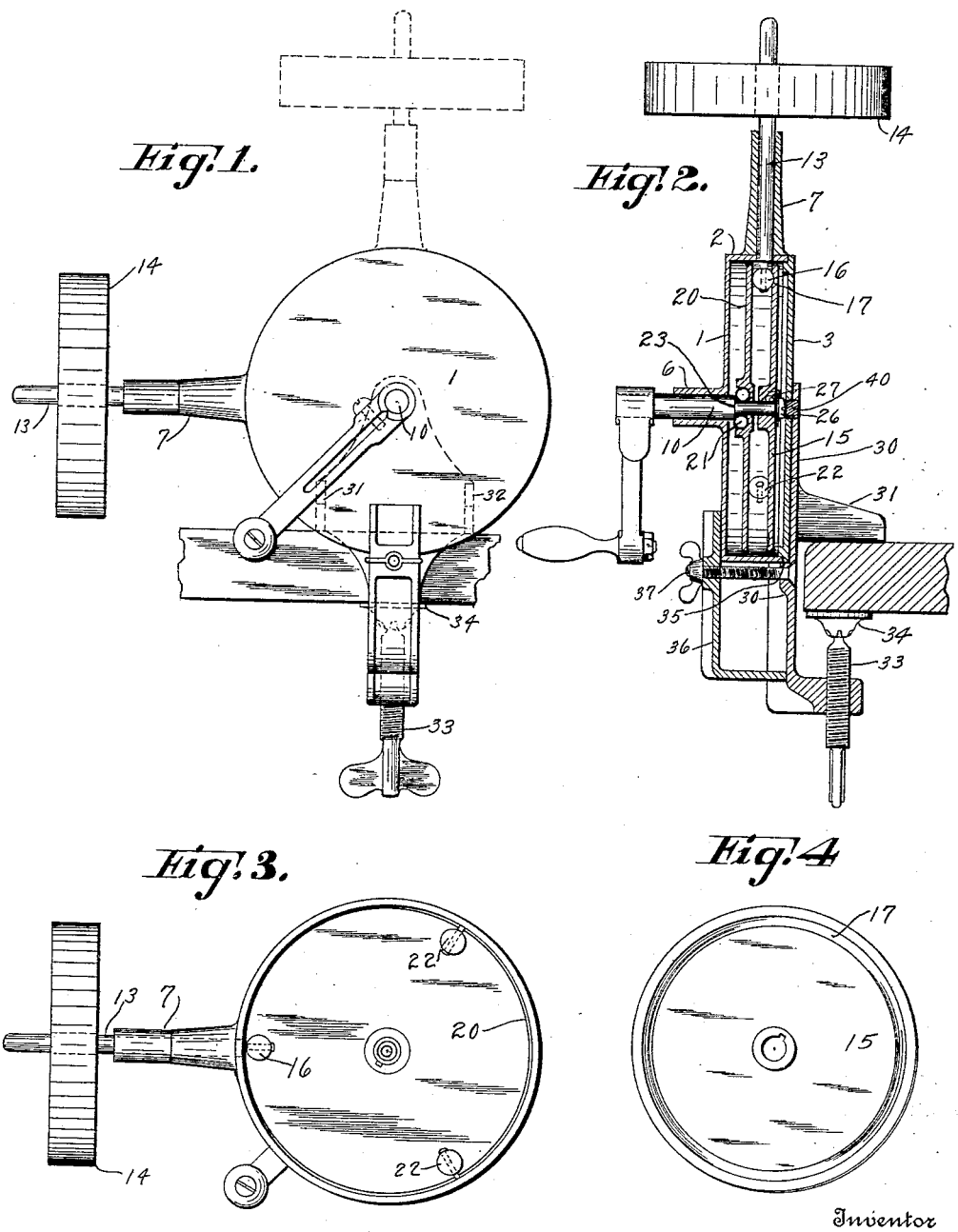

THOMAS A. PANYARD, OF MILWAUKEE, WISCONSIN, ASSIGNOR TO LUTHER GRINDER MANUFACTURING CO., OF MILWAUKEE, WISCONSIN, A CORPORATION OF WISCONSIN.

FRICTION DRIVE MECHANISM.

1,103,999.  Specification of Letters Patent.  Patented July 21, 1914.

Application filed September 25, 1912. Serial No. 722,208.

*To all whom it may concern:*

Be it known that I, THOMAS A. PANYARD, a citizen of the United States, residing at Milwaukee, county of Milwaukee, and State of Wisconsin, have invented new and useful Improvements in Friction Drive Mechanism, of which the following is a specification.

My invention relates to improvements in friction drive mechanisms.

The object of my invention is to provide a practical and efficient form of friction driving mechanism peculiarly adapted for operating grinding wheels, buffing wheels, milk testers, and in other cases where light power is used and rapid motion of the driven member is required with little noise in operation.

In the drawings Figure 1 is a front elevation of a grinding machine embodying my invention, with dotted lines indicating a possible adjustment of the grinding wheel. Fig. 2 is a sectional view, drawn to a plane exposing the driving and driven shafts axially. Fig. 3 is a rear view with the rear wall of the casing removed. Fig. 4 is a detail view of the driving disk, showing the grooved inner face thereof.

Like parts are identified by the same reference characters throughout the several views.

The casing is of a generally cylindrical form and comprises two members, one of which includes the integrally formed front and peripheral walls 1 and 2 respectively, while the other comprises the rear wall 3. The front wall 1 is provided with an axial bearing sleeve 6 and the peripheral wall 2 is provided with a radially extending bearing sleeve 7. These bearing sleeves are preferably formed integrally with the casing member on which they are mounted. A driving shaft 10 extends through the bearing sleeve 6 and may be actuated by a crank or from any other source of power. A driven shaft 13 is mounted in the bearing sleeve 7, and in the drawings a grinding wheel 14 is illustrated. Motion is transmitted from the shaft 10 to the shaft 13 through a friction disk 15 keyed to the shaft 10 and a friction wheel 16, rigid on shaft 13. The disk 15 is provided with an annular groove 17, preferably V-shaped, adapted for two point bearing contact with the spherically rounded periphery of wheel 16. A disk 20 is located between the disk 15 and the wall 1, with anti-friction bearings 21 interposed between it and shaft shoulder 23. This disk is loose on shaft 10, and near its periphery, it bears upon the wheel 16 at the opposite side from that upon which disk 15 bears. Rollers 22, interposed between disks 15 and 20, transmit power to disk 20, which acts as an auxiliary driver for the wheel 16. There are a plurality of these bearing rollers 22, and they are symmetrically disposed on opposite sides of the axis of shaft 13, projected, thus forming a three point support for the disks.

The inner end of shaft 10 is axially socketed to receive a screw 26. The head of this screw presses a clamping member 27 against disk 15 and regulates the pressure of the disk upon the wheel 16. The pull of the screw 26 upon shaft 10 causes a corresponding pressure to be exerted by disk 20 upon the opposite side of wheel 16, and there is therefore no tendency to cramp the disks or to spring the shaft 13 either forwardly or backwardly, the pressure of the disks being balanced and distributed to wheel 16 and roller 22. It will be understood that disk 15 is keyed to slide longitudinally upon shaft 10. The pressure of screw 26 is transmitted through the disks to the balls 21 and shoulder 23, and the shaft 10 is therefore free from end thrust.

A clamping bracket is employed to connect the mechanism above described with a suitable support. This comprises a bracket plate 30, having arms 31 and 32, with a clamping screw 33 extending through threaded bearings in the lower arm and provided with an ordinary swiveled clamping head 34. The bracket plate 30 is provided with a segmental shoulder 35 and a segmentally elbowed member 36 is adapted to engage the front wall 1 of the casing with the elbowed lower portion bearing against the plate 30. A clamping screw 37 extends horizontally through the vertical wall of member 36, and has screw threaded engagement therewith. The inner end of this screw is swiveled to the plate 30, and the screw may therefore be turned to bind the casing between member 36 and plate 30 with the casing resting upon the shoulder 35.

With the above described construction, it is obvious that the casing 1 may be revolved upon its support to swing the grinding wheel in an arc of a circle about the shaft 10.

When shaft 10 is rotated, the disk 15 revolves with it and the disk 20 turns in the opposite direction. The groove 17 not only multiplies the bearing area upon wheel 16, but also serves to hold said wheel and shaft 13 against radial movement, making it unnecessary to provide thrust bearings for this shaft. The casing wall 3 is preferably provided with a stud 40, which interlocks in a hole or socket in the bracket plate 30.

I claim—

1. The combination of a driving shaft, a set of friction disks, one loose on the shaft and the other secured to rotate with the shaft and free to move axially thereon, a driven shaft extending between the disks and a wheel thereon in bearing contact with their inner faces, and means adapted to coöperate with the driving shaft, to draw the disks into forcible contact with said wheel.

2. The combination with a driving shaft, a set of friction disks, one loose, and the other secured to rotate with the shaft, a radially disposed driven shaft extending outwardly from between said disks, a globular friction wheel on said radially disposed shaft, and means connected with the driving shaft for pressing the disks together.

3. The combination with a driving shaft, a set of friction disks, one loose, and the other secured to rotate with the shaft, a radially disposed driven shaft extending outwardly from between said disks, a friction wheel on said radially disposed shaft, and means connected with the driving shaft for pressing the disks together, the disk secured to rotate with the shaft being grooved to receive the friction wheel on the driven shaft.

4. The combination with a driving shaft, a set of friction disks, one loose, and the other secured to rotate with the shaft, a radially disposed driven shaft extending outwardly from between said disks, a friction wheel on said radially disposed shaft, and means connected with the driving shaft for pressing the disks together, the disk secured to rotate with the shaft being grooved to receive the friction wheel on the driven shaft, and said friction wheel being provided with a spherically rounded periphery.

5. The combination with a driving shaft, a set of friction disks, one loose, and the other secured to rotate with the shaft, a radially disposed driven shaft extending outwardly from between said disks, a friction wheel on said radially disposed shaft, and means connected with the driving shaft for pressing the disks together, together with a set of rollers interposed between said disks.

6. The combination with a driving shaft, a set of friction disks, one loose, and the other secured to rotate with the shaft, a radially disposed driven shaft extending outwardly from between said disks, a friction wheel on said radially disposed shaft, and means connected with the driving shaft for pressing the disks together, together with a set of rollers interposed between said disks, said rollers being symmetrically disposed on opposite sides of the projected axis of the driven shaft.

7. The combination with a driving shaft, a set of friction disks, one loose, and the other secured to rotate with the shaft, a radially disposed driven shaft extending outwardly from between said disks, a friction wheel on said radially disposed shaft, and means connected with the driving shaft for pressing the disks together, together with a cylindrical casing inclosing said disks.

8. The combination with a driving shaft, a set of friction disks, one loose, and the other secured to rotate with the shaft, a radially disposed driven shaft extending outwardly from between said disks, a friction wheel on said radially disposed shaft, and means connected with the driving shaft for pressing the disks together, together with a cylindrical casing inclosing said disks, and a clamping bracket adapted to engage both the casing and a supporting shelf or table.

9. The combination with a driving shaft, a set of friction disks, one loose, and the other secured to rotate with the shaft, a radially disposed driven shaft extending outwardly from between said disks, a friction wheel on said radially disposed shaft, and means connected with the driving shaft for pressing the disks together, together with a cylindrical casing inclosing said disks, and a clamping bracket adapted to engage both the casing and a supporting shelf or table, said casing being rotatively adjustable in the clamping bracket, and said bracket having a segmental shoulder upon which the casing bears.

10. The combination with a driving shaft, a set of friction disks, one loose, and the other secured to rotate with the shaft, a radially disposed driven shaft extending outwardly from between said disks, a friction wheel on said radially disposed shaft, and means connected with the driving shaft for pressing the disks together, together with means for balancing the pressure of said disks on opposite sides of the driving shaft.

In testimony whereof I affix my signature in the presence of two witnesses.

THOMAS A. PANYARD.

Witnesses:
LEVERETT C. WHEELER,
IRMA D. BREMER.

Copies of this patent may be obtained for five cents each, by addressing the "Commissioner of Patents, Washington, D. C."